United States Patent [19]

Katsuno

[11] Patent Number: 4,700,932
[45] Date of Patent: Oct. 20, 1987

[54] ANTI-IMPACT SAFETY APPARATUS FOR ROBOT

[75] Inventor: Hiroshi Katsuno, Nagoya, Japan

[73] Assignee: Tokai Sogo Sekkei Kabushiki Kaisha, Nagoya, Japan

[21] Appl. No.: 827,353

[22] Filed: Feb. 7, 1986

[30] Foreign Application Priority Data

Feb. 21, 1985 [JP] Japan ............................. 60-24433[U]

[51] Int. Cl.⁴ ...................... F16M 1/00; B61G 11/12; B25J 19/00; E02D 27/34
[52] U.S. Cl. ...................................... 267/136; 52/167; 188/266; 267/116; 414/735; 901/29; 901/49
[58] Field of Search ............... 267/136, 139, 113, 124, 267/116; 188/266, 272, 280, 281, 286, 287; 901/49, 29, 13; 414/735, 744 A, 730; 83/859, 701; 82/2 R; 30/382; 408/234, 710; 293/104, 134; 52/167

[56] References Cited

U.S. PATENT DOCUMENTS

| | | | |
|---|---|---|---|
| 3,598,206 | 8/1971 | Hennells | 188/287 |
| 3,834,686 | 9/1974 | Moritz et al. | 267/139 X |
| 4,332,989 | 6/1982 | Nicholaisen | 901/49 X |
| 4,540,331 | 9/1985 | Stanner et al. | 901/49 X |
| 4,639,184 | 1/1987 | Knasel et al. | 901/29 X |
| 4,655,674 | 4/1987 | Kohler et al. | 901/49 X |

FOREIGN PATENT DOCUMENTS

| | | | |
|---|---|---|---|
| 3331244 | 3/1985 | Fed. Rep. of Germany | 901/49 |
| 0844261 | 7/1981 | U.S.S.R. | 901/49 |

Primary Examiner—Andres Kashnikow
Assistant Examiner—Robert J. Oberleitner
Attorney, Agent, or Firm—Wenderoth, Lind & Ponack

[57] ABSTRACT

An anti-impact safety apparatus for a robot includes a buffer mechanism disposed between a swivel arm and a working arm of the robot. The buffer mechanism incorporates a converting mechanism which converts an electrical signal into a gas or liquid pressure. When an impact load, such as an axial load, eccentric load, or moment load, is applied to the working arm while in operation, the impact load is absorbed by the buffer mechanism and is also detected by a sensor switch, and the operation of the robot is instantaneously stopped. Thus, it is possible to protect the working arm and a function unit incorporated in the robot main body from the impact load. In addition, it is possible for the working arm to be readily restored to its normal position when the eccentricity thereof produced as a result of the impact is corrected.

24 Claims, 22 Drawing Figures (A)

(B)

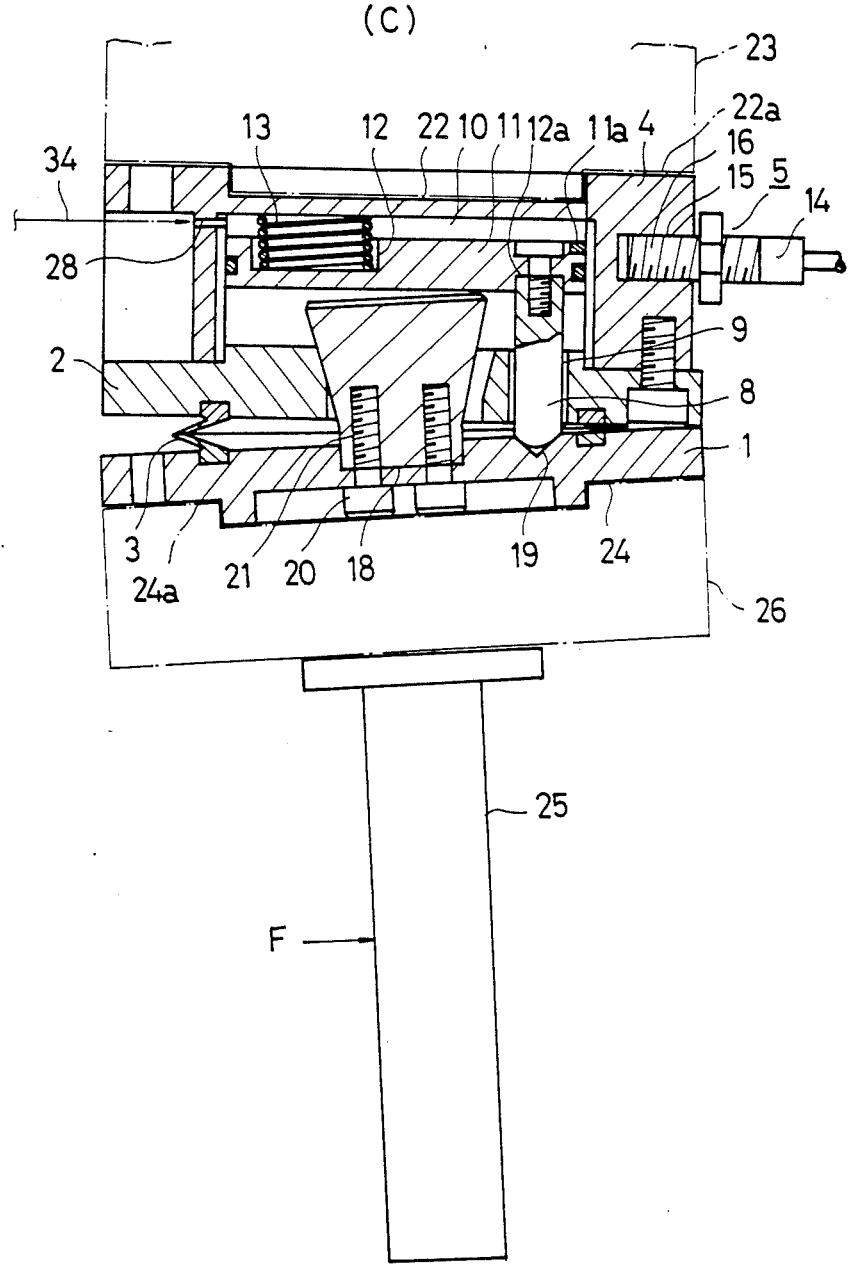

(A)

(B)

(C)

(A)

(B)

(C)

ANTI-IMPACT SAFETY APPARATUS FOR ROBOT

BACKGROUND OF THE INVENTION

1. Field of the Invention

The present invention relates to safety means for enabling complicated operations of robots to be safely, appropriately and smoothly effected. The present invention also pertains to means for ensuring safety in the operation of industrial machines, hand tools, vehicles and so forth.

2. Description of the Related Art

Robots, such as industrial robots, are generally put into practical use in various fields. High-technology robots which possess excellent working abilities have heretofore been developed for use in painting operation, e.g., robots which are capable of automatically detecting configurational features of various objects which have irregular shapes or are arranged at random by detecting the respective configurations of the objects, thereby enabling automation of a manufacturing operation in which a plurality of types of products are produced in small quantities; robots which are capable of detecting multi-dimensional positions of objects to be painted and thereby providing high operability which enables automation of the painting operation; and intelligent robots which have tactual senses. These robots which have the above-described excellent functions, that is, the tactual function and the function of detecting a random arrangement or multi-dimensional positions of objects, still involve risks in operation. More specifically, when a working arm of such a robot in operation hits a foreign body which suddenly and accidentally enters the robot working area, or an object of painting other than those which are included in a predetermined working program, due to functional error such as sensing error or tactual function error, the impact load generated as a result of this collision may damage the function unit incorporated in the robot main body. As means for preventing occurrence of such an accident, one type of robot has heretofore been provided with a buffer device such as that shown in FIG. 14. The buffer device 40 comprises a fixed plate 42 secured to a swivel arm 41 of a robot main body (not shown), a fixed plate 42a secured to a working arm 43, and a leaf spring 44 having both ends thereof respectively secured to the fixed plates 42 and 42a.

The buffer device 40 operates as follows. When the working arm 43 hits a solid body such as a foreign body which accidentally enters a predetermined working area of the working arm 43, an object to be worked, an object other than those which are included in a working program, or a portion or member, e.g., an accessory member of the object to be worked, which is intended to be out of a predetermined area of the movement of the working arm 43, due to a failure in a predetermined sensing function or tactual function, the impact load generated at this time can be practically absorbed by virtue of the elasticity of the leaf spring, so that it is possible to buffer the impact.

However, since the robot continuously conducts the operation for a predetermined working area even after the above-described accident has occurred, the impact load often causes the robot main body to be damaged, or the leaf spring may be deformed or broken, resulting in displacement of the working arm 43. When the working arm 43 is displaced or offset, it is completely impossible for the robot to automatically restore the working arm 43 to its normal position, and it is necessary to re-teach the robot. Since a long time is required to effect the re-teaching operation, the whole operation of the robot must be stopped during this period, which disadvantageously leads to the stop of the operation of the whole manufacturing line.

Further, various means have heretofore been adopted for avoiding or absorbing the impact generated during the machining or assembling operation of an automatic loader, a lathe or other industrial machines, and the continuous vibration of a chain saw or an air hammer, and for ensuring safety at the time of collision of a motor vehicle. However, most of these means are incomplete and unsatisfactory.

SUMMARY OF THE INVENTION

In view of the above-mentioned circumstances, it is a primary object of the present invention to provide an anti-impact safety apparatus for a robot which includes a buffer mechanism disposed between a swivel arm of the robot and a working arm selected in accordance with the kind of work which is to be conducted, the buffer mechanism being capable of coping with omnidirectional impact loads, continuous or violent vibrations, impact applied by collision and so forth in such a manner that such impacts and vibrations are effectively absorbed or avoided, thereby ensuring safety in the operation of robots, industrial machines, hand tools, structures such as buildings and objects which are required to possess resistance against earthquake shock, motor vehicles and so forth.

To this end, the present invention provides an anti-impact safety apparatus for a robot which has a main body including a swivel arm constituted by a plurality of articulated mechanisms and capable of swiveling and moving vertically and horizontally, and a function unit for actuating the swivel arm. The apparatus comprises a buffer mechanism which is disposed between the swivel arm and a working arm having an individual working function and selected in accordance with the kind of work which is to be conducted, the buffer mechanism including a pair of fixed and movable plates disposed in such a manner that they face each other with a spacing therebetween which is variable. The buffer mechanism further includes a center guide which is movably fitted into a guide hole provided in the center of the fixed plate, the guide hole having a configuration conformable to that of the center guide. A base plate is integrally connected to the rear side of the fixed plate, the base plate being so designed that it can be detachably connected to the swivel arm. The base plate is provided with a cylinder which slidably receives a piston in the form of a flat plate. The piston is biased toward the guide hole by means of gas or liquid pressure (gas pressure is employed in one embodiment of the present invention). A plurality of pins are provided on one side of the piston, that is, the side thereof which faces the guide hole, in such a manner that the pins project toward the movable plate and are parallel to the axis of the guide hole, the pins being disposed around the same circumference. A magnetically operated sensor switch is disposed on the peripheral surface of the cylinder such that the switch stops the operation of the function unit incorporated in the robot main body by coming into proximity with a permanent magnet provided on the piston. A recess is formed in the rear side of the base plate so as to define a fitting surface through which the base plate can be detachably connected to the swivel arm. The movable plate is provided in the center thereof with a recess into which the end portion of the center guide is fitted. In addition, a plurality of screw receiving bores are provided in the recess of the movable plate so as to extend therethrough, while a number of threaded bores which is equal to that of screw receiving bores are provided in the center guide for securing it, and screws are respectively received in the threaded bores, whereby the movable plate and the center guide are connected together as one unit. The movable plate is provided along the peripheral edge thereof with a doughnut-shaped fitting surface which enables the working arm to be readily attached to and detached from the movable plate.

By virtue of the above arrangement, when an impact load which exceeds a reference value or predetermined load is applied to the working arm in any direction, information about the application of this impact load is delivered to the sensor switch through the pins and the permanent magnet provided on the piston which is integral with the pins, thereby instantaneously stopping the operation of the function unit in the robot main body by means of a detection signal outputted from the sensor switch and thus preventing the impact load from causing the function unit to be damaged.

Thus, according to the present invention, the anti-impact buffer mechanism is disposed between the swivel arm of the robot and a working arm selected in accordance with the kind of work which is to be conducted such that the buffer mechanism responds to an impact load applied in any direction so as to effectively absorb and avoid the impact load. In addition, the working arm which has been displaced by the impact load is restored to its normal position by the self-correcting function, thus increasing the level of safety in the operation of robots, industrial machines, vehicles and so forth, and improving operability in painting, machining and assembling parts.

DESCRIPTION OF THE PREFERRED EMBODIMENTS

One embodiment of the present invention will be described hereinunder in detail with reference to the accompanying drawings.

Figure 1:
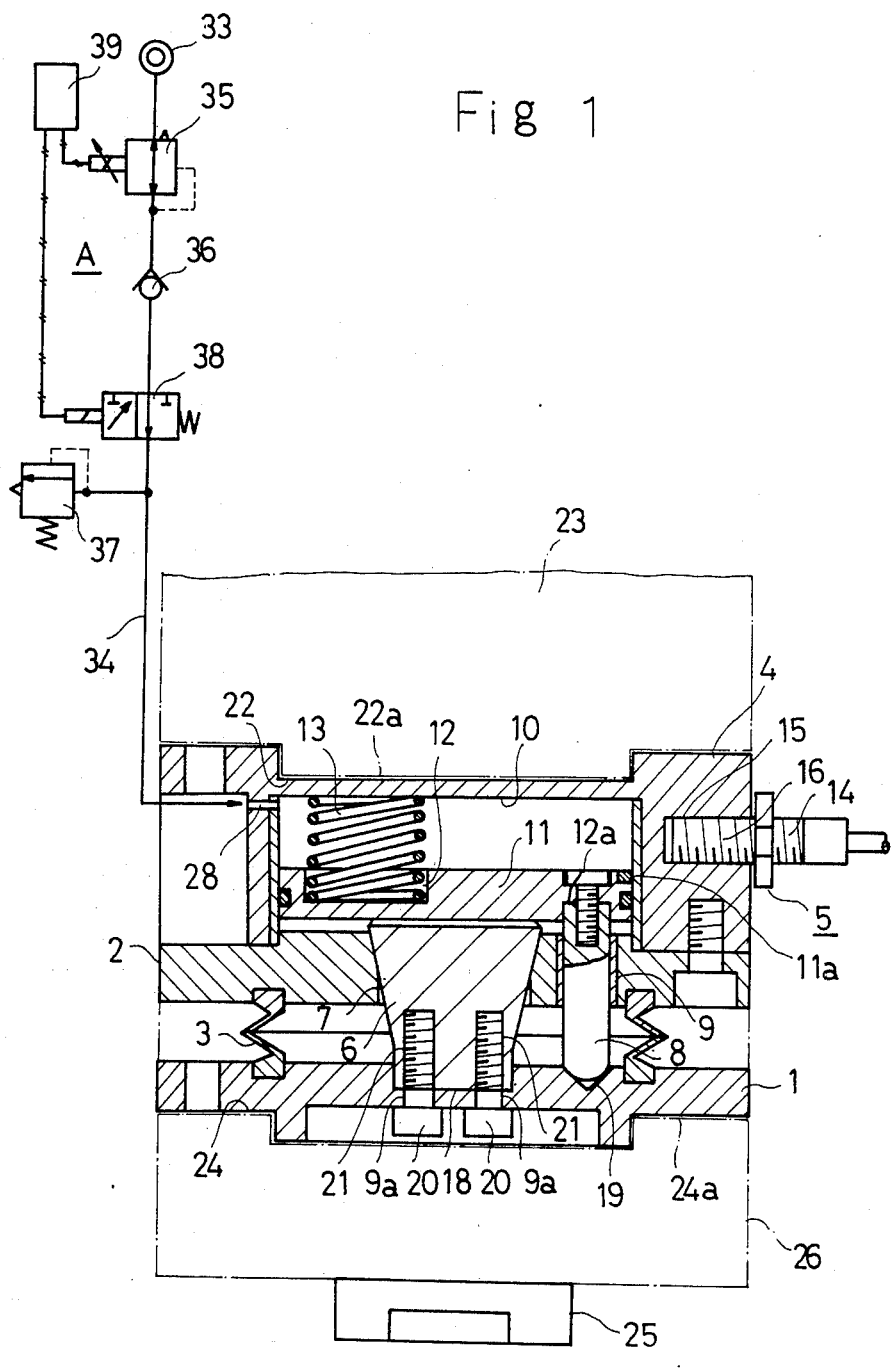
FIG. 1 is an enlarged sectional view of one embodiment of the apparatus according to the present invention, which shows the way in which the buffer mechanism and the converting mechanism thereof are linked together.
Figure 2:
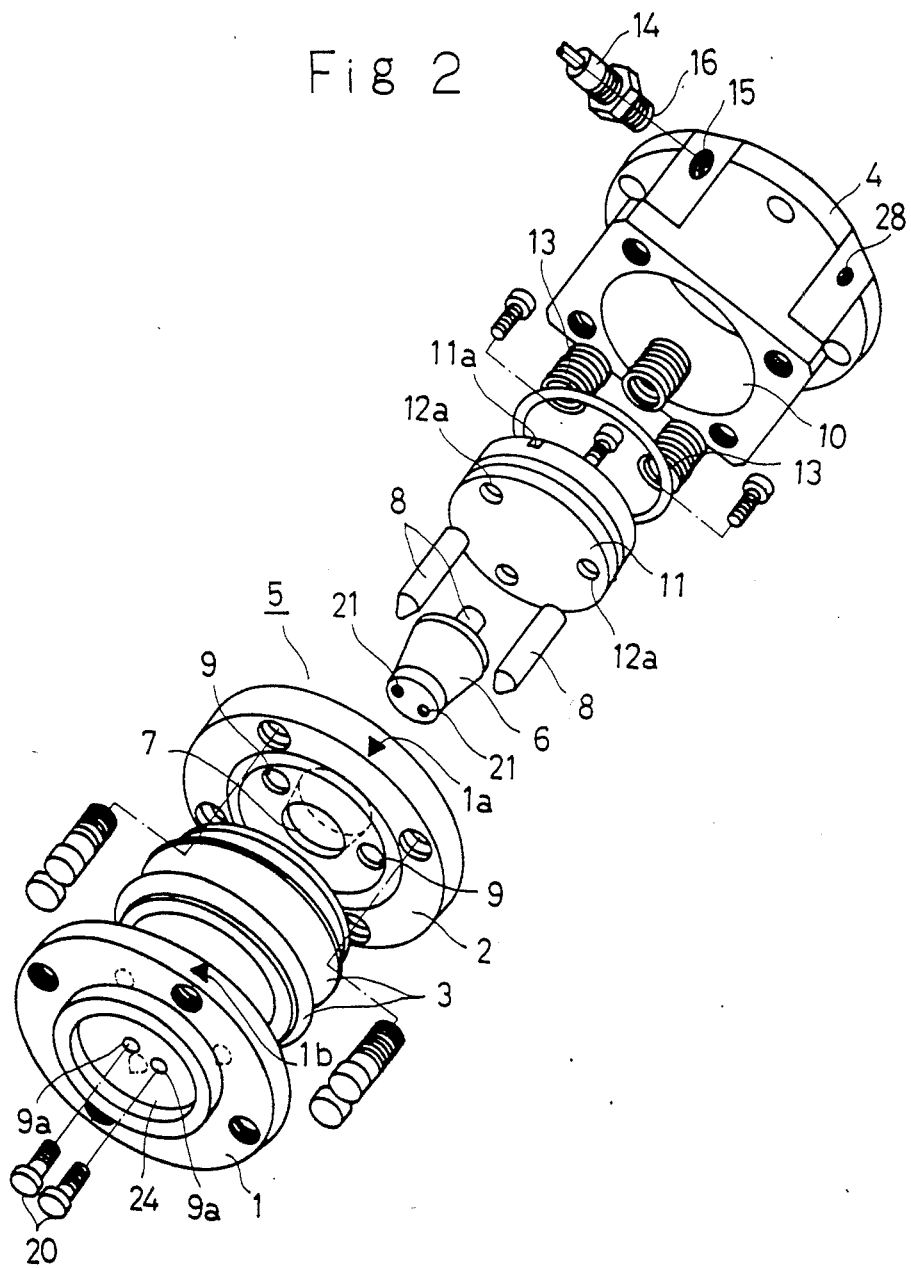
FIG. 2 is an exploded perspective view of the buffer mechanism of the apparatus according to the present invention.
Figure 3:
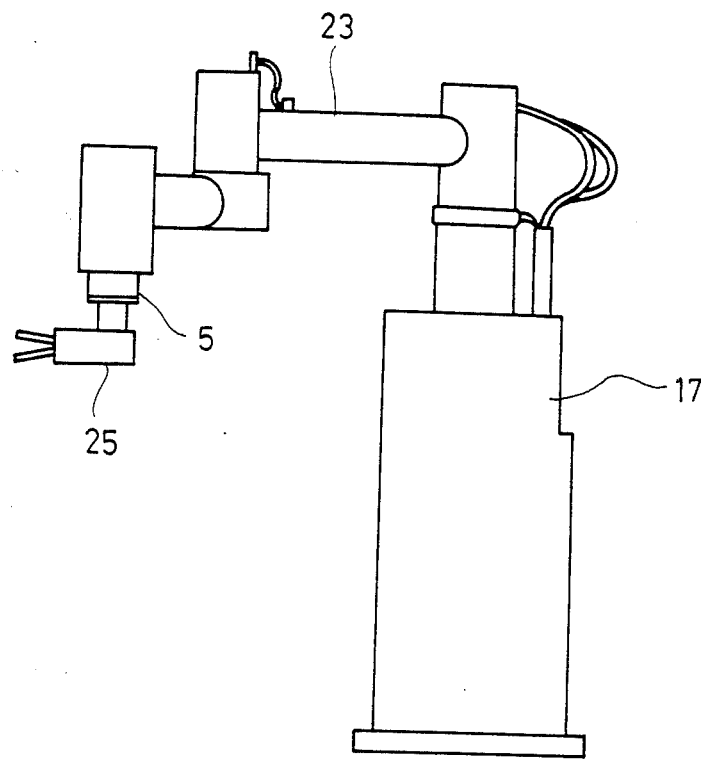
FIG. 3 shows a general robot main body equipped with the apparatus according to the present invention.

In this embodiment, as shown in FIGS. 1 to 3, a movable plate 1 and a fixed plate 2 face each other across an annular resilient seal 3 so that the spacing between the movable and fixed plates 1 and 2 is variable. The movable and fixed plates 1 and 2 are provided on the respective axially peripheral surfaces with registration marks 1a and 1b which align in a predetermined angular position and show the fact that the movable and fixed plates 1 and 2 face in the normal or correct position when the marks 1a and 1b are aligned with each other. A base plate 4 is bolted to the rear side of the fixed plate 2 so that the fixed and base plates 2 and 4 are connected together in one unit, thereby constituting a buffer mechanism 5. The fixed plate 2 is provided in its center with a conical guide hole 7 which extends therethrough and has a configuration conformable to that of a conical center guide 6 (described later). The center guide 6 is movably received in the guide hole 7. Pin receiving holes 9 for respectively receiving pins 8 (described later) are provided in the fixed plate 2 so as to extend therethrough and surround the guide hole 7. The fixed plate 2 is bolted to the base plate 4 so that the fixed and based plates 2 and 4 are connected together in one unit. The base plate 4 is provided with a piston means for absorbing an impact load transmitted to the movable plate 1 and which comprises a cylinder 10 which slidably receives a piston 11 operated by fluid pressure in the form of a flat plate. The piston 11 is provided on the rear side thereof with recesses 12 in each of which is disposed spring means such as a spring 13 for supplementing fluid pressure, such as air pressure, by biasing the piston 11 toward the fixed plate 2. In addition, a plurality of recesses 12a are provided on the front side of the fixed plate 2 so as to be disposed on the same circumference. The pins 8 are respectively fitted into and secured to the recesses 12a by means of bolts. A sensor switch means includes a magnet 11a and a magnetically activated switch 14 which has its terminal portion 16 inserted into an inerstion bore 15 provided in the base plate 4 so as to be located outside the cylinder 10 but along the path of movement of the piston 11 in such a manner that the terminal portion 16 is able to come into and out of proximity with the permanent magnet 11a which is provided on the piston 11 to thereby activate the switch 14. The arrangement is such that when the buffer mechanism 5 is subjected to an impact load which exceeds a reference value, the impact load including an omnidirectional or axial load, eccentric load, or moment load, which may be applied to a first element such as a working arm 25 (described later), the impact load is converted into an axial load which presses against the pins 8, thus moving the piston 11 integral with the pins 8 in the same direction, whereby the impact load is detected by the sensor switch means 14 through the permanent magnet 11a. In response to the detection of the impact load, the sensor switch outputs a detection signal and the operation of an electrically operated function unit associated with a second member such as a robot main body 17 is instantaneously stopped. The movable plate 1 has a seat 18 provided on the side thereof which faces the fixed plate 2, the seat 18 receiving the cylindrical end portion of the center guide 6. The movable plate 1 further has conical holes 19 provided on the surface thereof where the seat 18 is provided, the number of conical holes 19 being equal to that of the pins 8, so that when subjected to the axial load, the free ends of the pins 8 are respectively fitted into the holes 19 when the fixed plate 2 and the movable plate 1 are aligned in a predetermined angular position. The center guide 6 is integrally connected to the movable plate 1 in such a manner that screws 20 which are passed through screw receiving bores 9a provided in the bottom of the seat 18 are respectively screwed into threaded bores 21 provided in the center guide 6, thereby constituting a part of the buffer mechanism 5. The mechanism 5 can be detachably connected to the second member, such as a swivel arm 23 of the robot main body 17, through fitting engagement between a fitting surface 22 constituted by a recess provided in the outer surface of the base plate 4 and a fitting surface 22a provided on the swivel arm 23. Similarly, a connector 26 for the first member, such as a working arm 25, is detachably connected to the movable plate 1 through fitting engagement between a fitting surface 24 formed on the movable plate 1 and a fitting surface 24a formed on the connector 26, the working arm 25 being capable of working as desired and appropriately selected in accordance with the kind of work which is to be conducted. By virtue of the above arrangement, when a moment load which exceeds a reference value is applied to the working arm 25, a turning force acts on the movable plate 1 in a direction in which the plate 1 rotates relative to the fixed plate 2 out of the first angular position, and the pins 8 are disengaged from the respective holes 19, thereby allowing the movable plate 1 to turn freely. On the other hand, when the impact load is not greater than the reference value, the piston 11 is held in position with respect to the fixed plate 2 by virtue of the air pressure, as shown in FIG. 1, and this, together with the alignment of the registration marks 1a and 1b, enables the respective centers of the movable and fixed plates 1 and 2 to be maintained in a coincident state.

A pressure converting mechanism A is, as shown in FIG. 1, composed of: a fluid passage such as an air line 34 connecting together an air supply source 33 and a through-hole 28 provided in the base plate 4 so as to be communicated with the interior of the cylinder 10; an electropneumatic pressure-regulating valve 35, a check valve or non-return valve 36, a solenoid-controlled valve 38 and a relief valve 37 for coping with abnormally high pressure, all of which are disposed in series on the airline 34; and a solenoid-controlled valve 38 is provided between the relief valve 37 and the check valve 36 for the purpose of supplying and discharging air. By virtue of this arrangement, when an overload is applied to the movable plate 1 and the piston 11 is consequently pressed toward the center guide 6 so as to cause the air pressure within the cylinder 10 to be increased above a level at which the relief valve 37 is set, the air within the cylinder 10 is discharged to the atmosphere or into an air storing tank (not shown) by the operation of the relief valve 37, whereby a shock absorbing operation is effected. This operation is repeated every time the impact load is applied.

FIGS. 5(A) to 5(C) show an example of an application of the buffer mechanism 5, in which the buffer mechanism 5 is attached to the working arm 25 of an automatic loading or other similar means for effecting a relatively simple operation of assembling parts of machines, devices and so forth, or automatic feed of small articles or parts, and in which a chuck 27 is connected to the buffer mechanism 5, and a pin 31 clamped by the chuck 27 is fitted into a hole 32 in a work-piece. In this case, even when there is some eccentricity between the respective central axes of the chuck 27 and the hole 32 such as that shown in FIG. 5(A), when the distal end of the pin 31 hits the edge of the hole 32 in this state, the chuck 27 clamping the pin 31 shifts the pin 31 so that the respective central axis of the pin 31 and the hole 32 coincide with each other without any resistance by virtue of the flexibility of the buffer mechanism 5, whereby it is possible for the fitting operation to be smoothly conducted, as shown in FIG. 5(B). Even when the respective central axes of the pin 31 and the hole 32 are diagonally eccentric with respect to each other, as shown in FIG. 5(C), it is possible to smoothly effect the fitting operation without any resistance.

Figure 6:
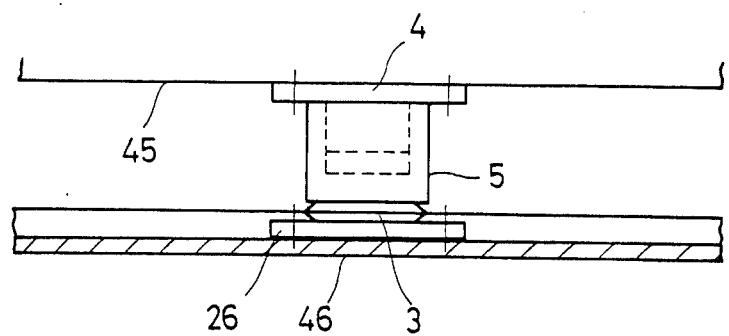
FIG. 6 shows the operation of the apparatus when the present invention is applied to a motor vehicle.

FIG. 6 shows an example in which the buffer mechanism 5 with no pressure converting mechanism A is applied to a motorized vehicle. In this case, a plurality of buffer mechanisms 5 are mounted on the front and rear ends 45 of a motor vehicle, and a bumper 46 is connected to the front side of each buffer mechanism 5 through a connector 26, whereby it is possible to buffer the impact generated at the time of collision of the vehicle since the piston 11 is retracted into the cylinder 10 and the permanent magnet 11a mounted on the piston 11 approaches the sensor switch 14 to thereby actuate the sensor switch 14 to effect a stoppage of movement of the vehicle such as by stopping the motor thereof and applying a braking force with suitable braking means.

The robot main body 17 is constituted by a plurality of articulated mechanisms which enable swiveling, vertical movement and horizontal movement. The robot incorporates a function unit which enables the swivel arm 23 and the working arm 25 to be controlled so as to effect painting, welding, and machining or assembling of small articles or parts. The function unit is linked with the sensor switch 14 so that when the sensor switch 14 detects an impact load acting on the buffer mechanism 5 during operation, the sensor switch 14 causes the operation of the function unit to be instantaneously stopped. Further, the arrangement is such that the movable plate 1 which has become eccentric by the action of the impact load is restored to its normal position by virtue of the shock absorber type linked operation of the piston 11 and the pressure converting mechanism A.

FIGS. 7 to 12 respectively show examples of a pressure adjusting mechanism for variably adjusting the level of the resilient pressure produced by the spring means comprising the springs 13 in accordance with the magnitude of impact which may be applied to the buffer mechanism 5.

Figure 7:
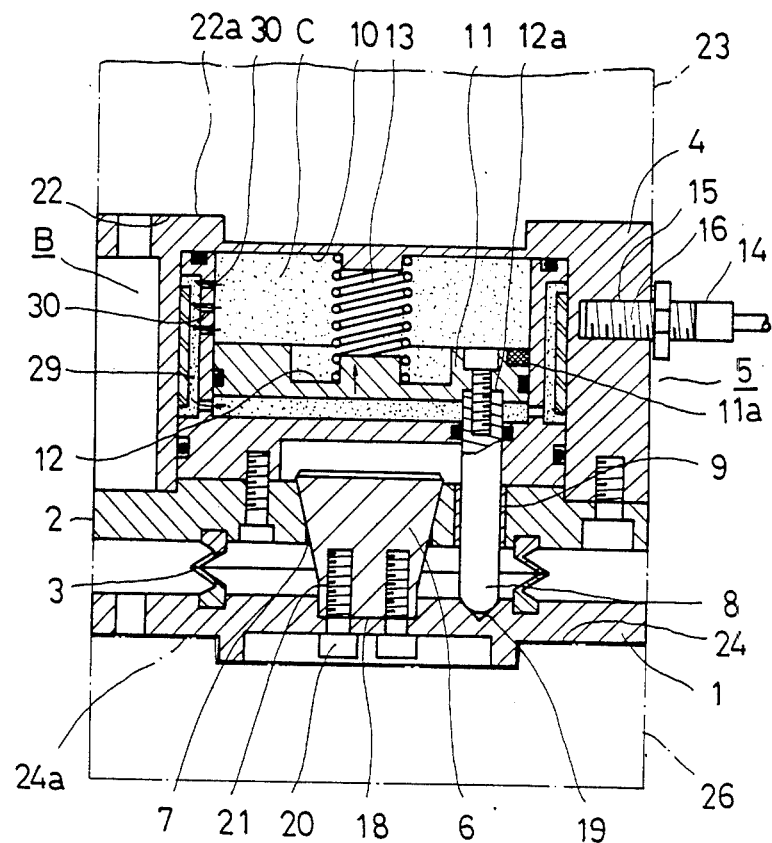
FIGS. 7 to 12 respectively show examples of the resilient pressure adjusting mechanism which is linked with the buffer mechanism according to the present invention.

In the pressure adjusting mechanism B shown in FIG. 7, the cylinder 10 is filled with working oil C, and the cylinder 10 and a jacket 29 which surrounds the cylinder 10 are communicated with each other on both sides of the path of movement of the piston by means of a plurality of fluid passages comprising orifices 30. Thus, when an impact load acts on the working arm 25, the pins 8 are moved in a direction in which the spring 13 is compressed, and the piston 11 is pressed by the pins 8, thus causing the working oil C to be forced out of the cylinder 10 to the jacket 29 through the orifices 30, whereby the impact load is absorbed by means of the hydraulic resistance generated when the working oil C passes through the orifices 30.

Figure 8:
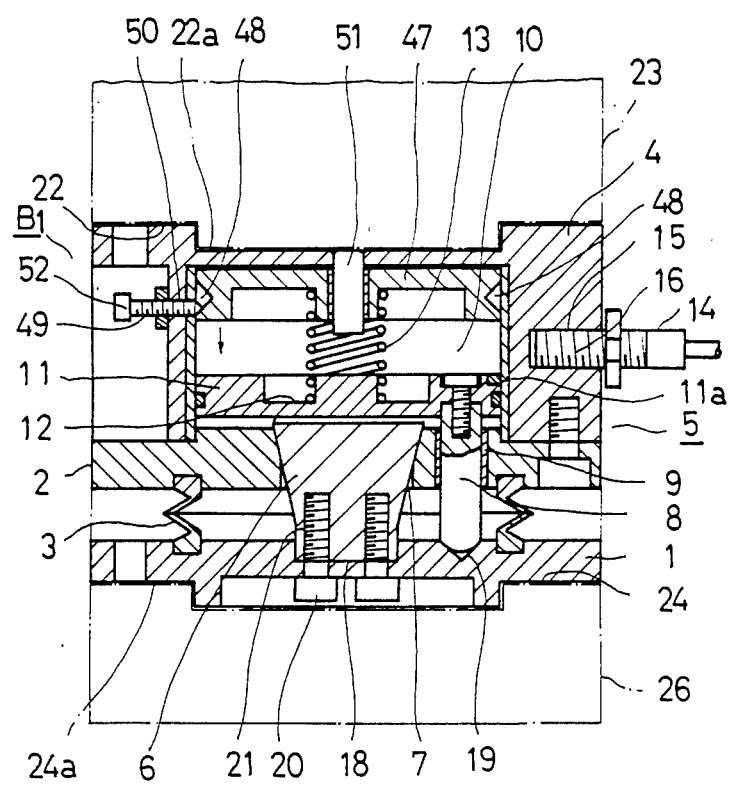

In the pressure adjusting mechanism B1 shown in FIG. 8, a spring retainer plate 47 is incorporated in the cylinder 10 so as to face the piston 11, and an annular groove 48 having a V-shaped cross-section is provided in the peripheral surface of the spring retainer plate 47. Further, an adjusting bolt 49 is received through a threaded bore 50 provided in the wall of the cylinder 10 such that the bolt 49 can come in and out of the annular groove 48. Thus, the resilient pressure which is produced by the spring 13 and applied to the piston 11 is adjusted by varying the length by which the inner end of the adjusting bolt 49 is forced into the annular V-shaped groove 48. The spring retainer plate 47 is linked with the buffer mechanism 5 such that the plate 47 can advance and withdraw along a guide pin 51 which is provided on the base plate 4 so as to extend into the cylinder 10.

Figure 9:
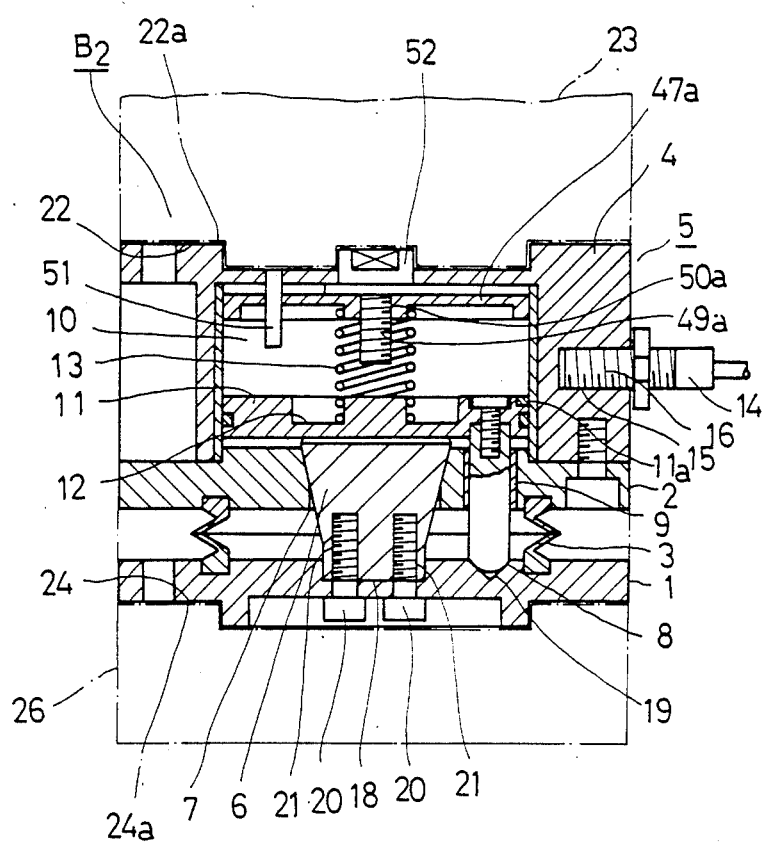

The pressure adjusting mechanism B2 shown in FIG. 9 also includes a spring retainer plate 47a disposed within the cylinder 10. This spring retainer plate 47a is provided in its center with a threaded bore 50a which receives an adjusting bolt 49a inserted from the outer side of the base plate 4. Thus, the spring retainer plate 47a is pressed toward the piston 11 by turning a knob 52 provided on the bolt 49a, and the resilient pressure of the spring 13 is thereby adjusted.

Figure 10:
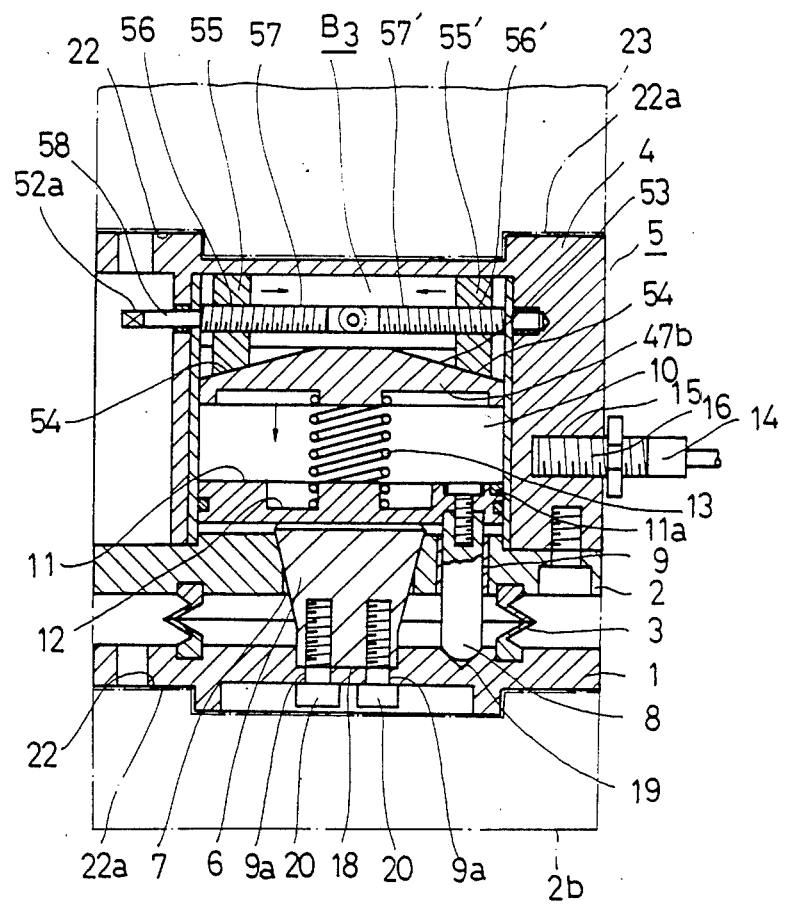
Figure 11:
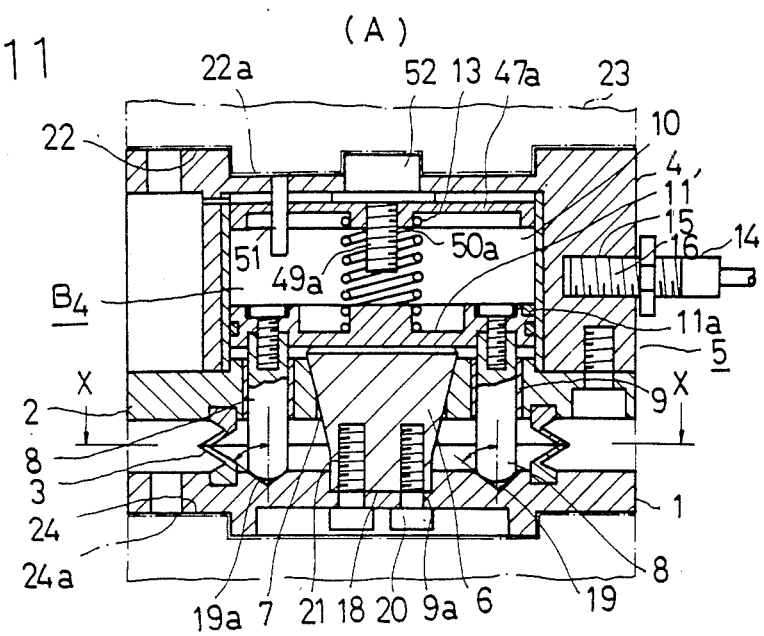
Figure 11:
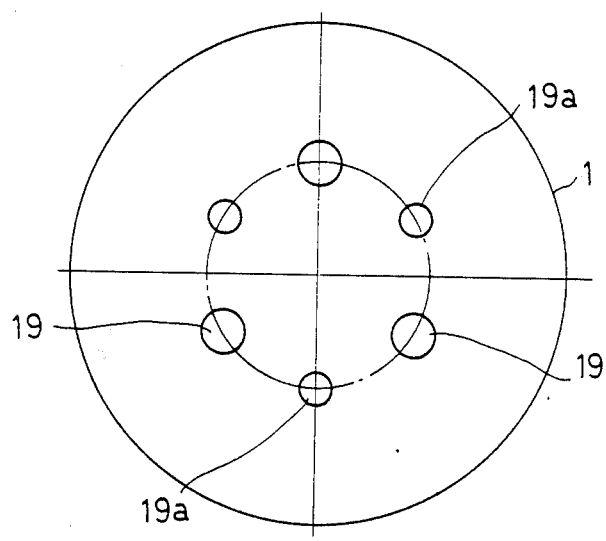
Figure 11:
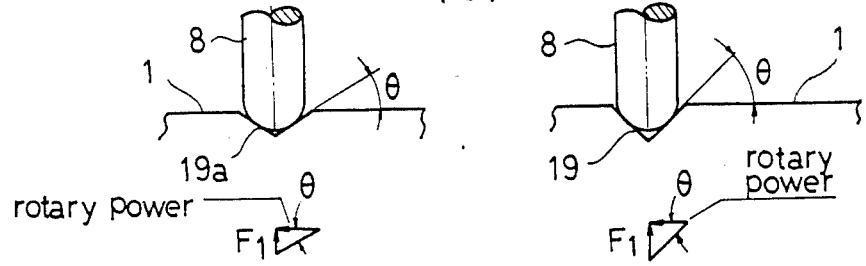

In the pressure adjusting mechanism B3 shown in FIG. 10, a spring retainer plate 47b is disposed within the cylinder 10 so as to face the piston 11. This spring retainer plate 47b has a conical surface 53 with a gentle slope formed on the side thereof which is remote from the piston 11. Further, feed actuators 55 and 55' are disposed within the cylinder 10 in such a manner that the respective axial ends of the actuators 55 and 55' abut against the peripheral portion of the conical surface 53, said axial ends having slanted surfaces 54 which are conformable to the conical surface 53. The feed actuators 55 and 55' respectively have a right-hand threaded bore 56 and a left-hand threaded bore 56'. A threaded rod 58 is received through these bores 56 and 56' so that a right-hand threaded portion 57 and a left-hand threaded portion 57' which are formed on the rod 58 are respectively engaged with the bores 56 and 56'. Thus, the feed actuators 55 and 55' are moved in contact with the conical surface 53 toward and away from each other as shown by the arrows by turning a knob 52a provided on the outer end of the rod 58 in predetermined directions, whereby the spring retainer plate 47b is fed or moved toward the piston 11, and the resilient pressure of the spring 13 is thereby adjusted.

The pressure adjusting mechanism B4 shown in FIGS. 11(A)-11(C) is arranged such that bores 19 and 19a which have different taper angles are provided in the movable plate 1 in such a manner that they are alternately disposed along the same circumference, and a number of pins 8 which is equal to that of the bores 19 and 19a are provided on the piston 11 so as to face the bores 19 and 19a, respectively, whereby it is possible to vary the flexing reference load in the direction in which the movable plate 1 is turned.

Figure 5:
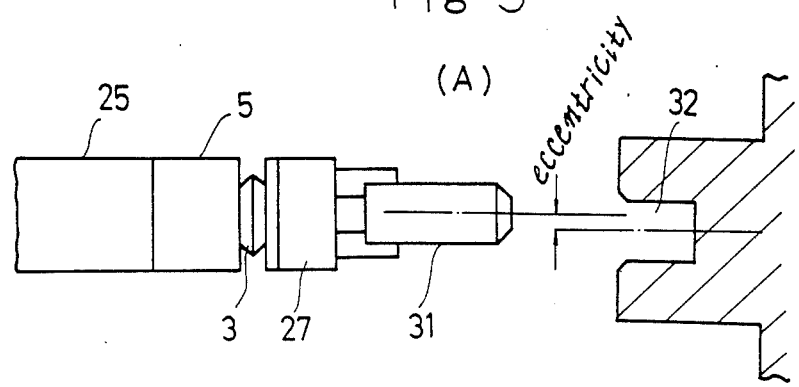
FIGS. 5(A) to 5(C) show the operation of the apparatus in examples of application of the present invention, for example, an assembling operation.
Figure 5:
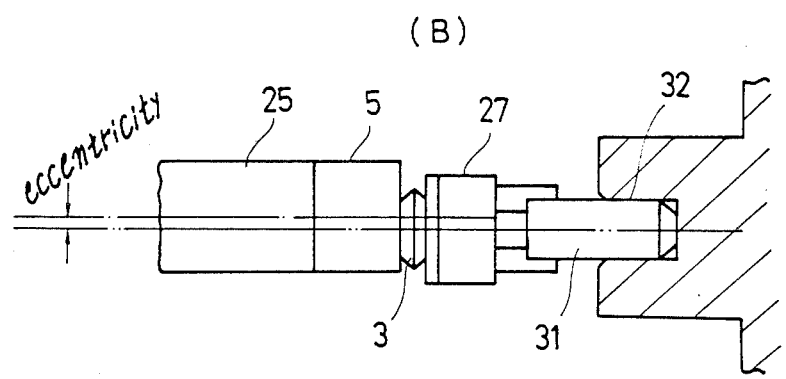
Figure 5:
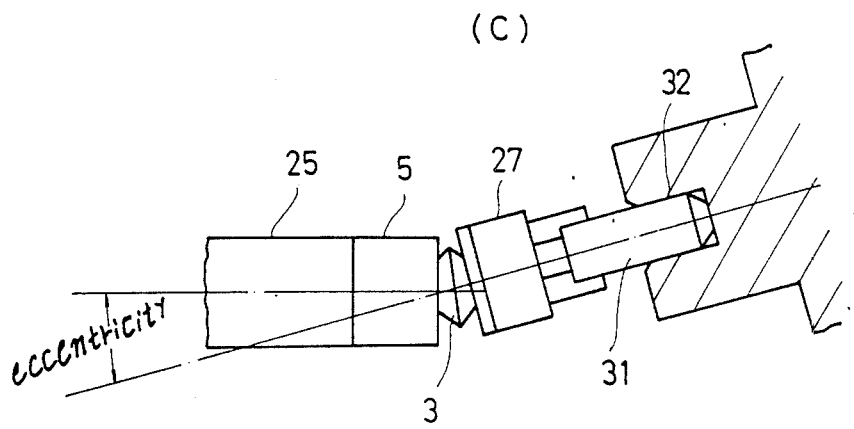
Figure 12:
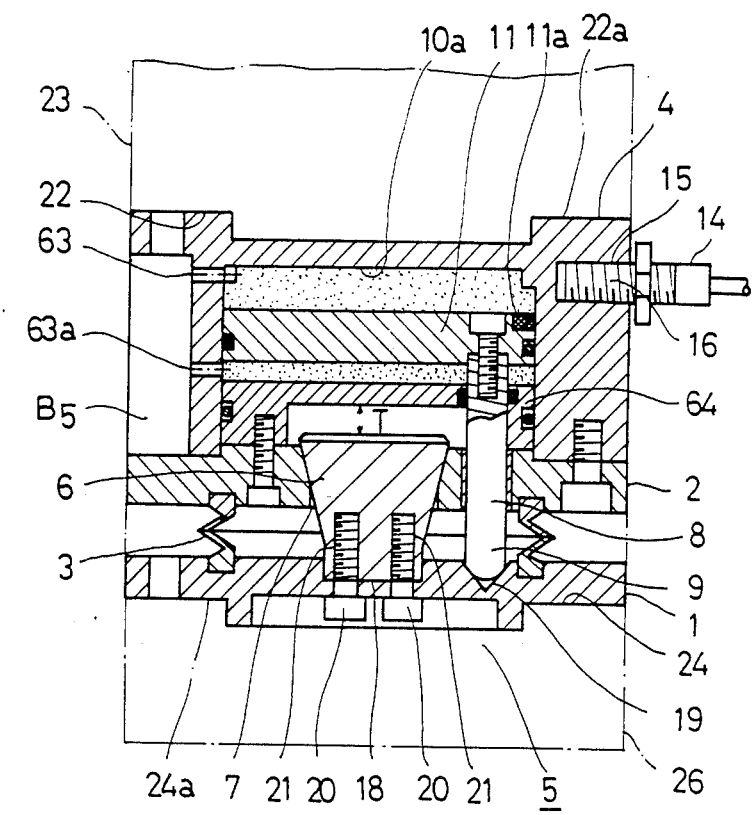

The pressure adjusting mechanism B5 shown in FIG. 12 is disposed in the buffer mechanism 5 so that the mechanism 5 is suitably employed for an operation of automatically assembling parts using the working arm 25 which is shown in FIG. 5. More specifically, air inlet bores 63 and 63a are provided in the peripheral wall of a cylinder 10a so that the piston 11 is positioned between the bores 63 and 63a which are selectively communicated with the air supply source. An inner cover 64 is provided on the fixed plate 2 so that a predetermined spacing T is provided between the cover 64 and the center guide 6. Thus, when the pin 31 (see FIG. 5) which is an object to be inserted is being transported toward the hole 32 is an object which is to be assembled, air is supplied through the air inlet bore 63 so as to press the piston 11 toward the inner cover 64, whereby a stable pressurized state is constantly maintained during the transportation of the pin 32, and immediately before the pin 31 is fitted into the hole 32, air is also supplied through the air inlet bore 63a so as to press the piston 1 in the opposite direction, thereby causing the distal ends of the pins 8 to come out of the respective holes 19 of the movable plate 1 and thus allowing the movable plate 1 to move freely, which allows the fitting operation to be smoothly conducted while accurately correcting any possible eccentricity present between the pin 31 and the hole 32.

Figure 13:
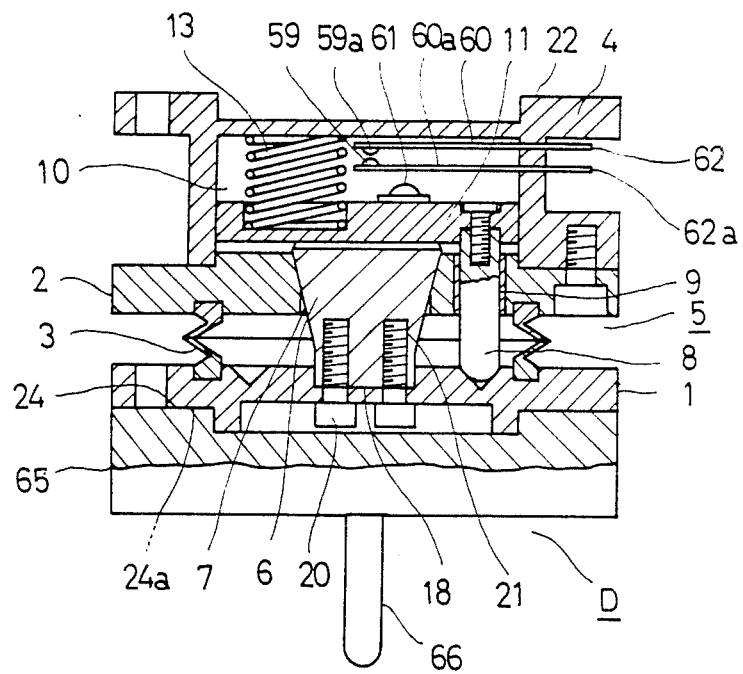
FIG. 13 shows another example of the working arm.
Figure 14:
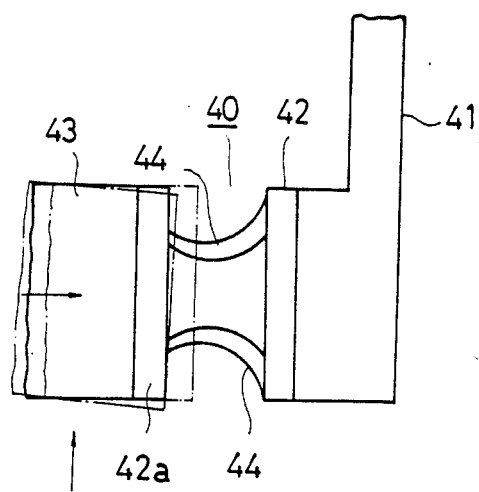
FIG. 14 shows the prior art.

In the buffer mechanism 5 shown in FIG. 13, a tactual head 65 having a tactual portion 66 is attached to the movable plate 1 in place of the working arm 25, and a tactual mechanism D is provided within the cylinder 10, the mechanism D including fixed and flexible plates 60 and 60a respectively having electrical contacts 59 and 59a and disposed in such a manner that these contacts face each other. In operation, when the piston 11 is displaced, a plunger 61 which is provided on the piston 11 presses the flexible plate 60a, thus allowing the contacts 59 and 59a to come into and out of contact with each other in response to the movement of the piston 11. In addition, the respective terminal portions 62 and 62a of the fixed and flexible plates 60 and 60a are connected to a power supply, whereby it is possible to automatically detect configurational features of, for example, objects of painting which have irregular shapes or are arranged at random, and to detect also multi-dimensional positions of such objects.

Figure 15A:
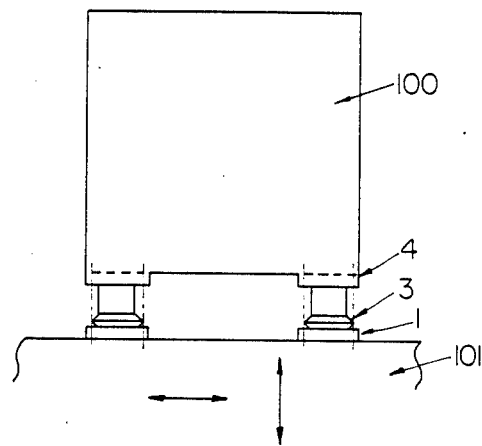
FIG. 15A shows an example of the buffer mechanism interposed between a foundation and a building and FIG. 15B shows more details of the buffer mechanism shown in FIG. 15A.
Figure 15B:
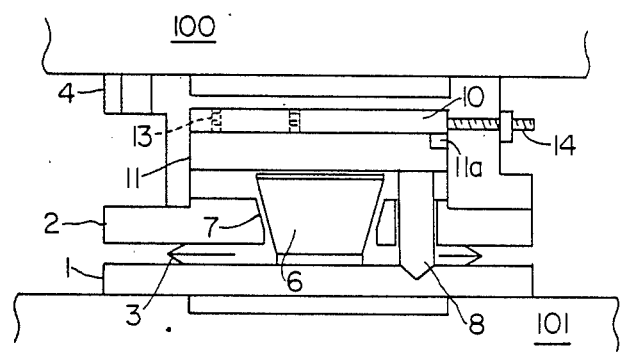

FIGS. 15A and 15B show the buffer mechanism of the present invention disposed between a structure such as a building 100 and a foundation 101 whereby an earthquake shock in excess of a reference value activates the switch 14 to shut down electrical systems in the building which should be stopped in the event of an earthquake.

Figure 4:
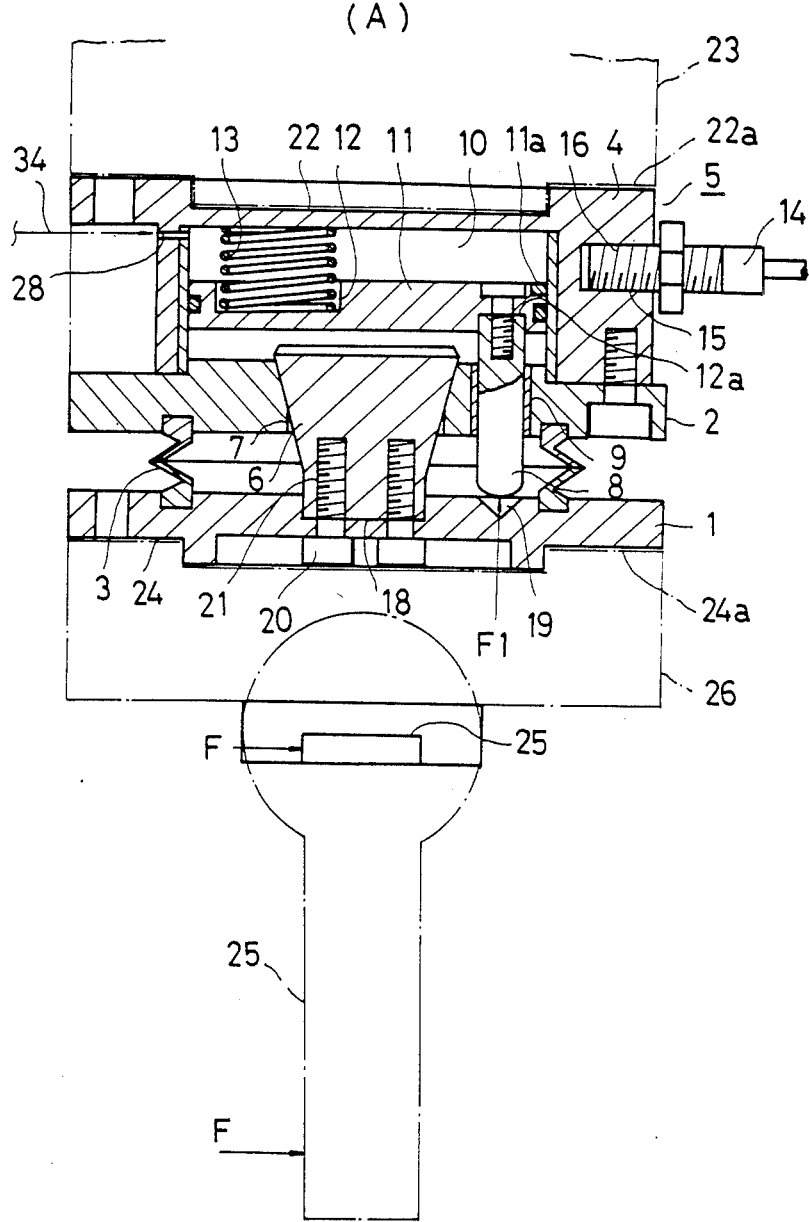
FIGS. 4(A) to 4(C) show the operation of the apparatus taking place when various types of impact load are applied to the working arm.
Figure 4:
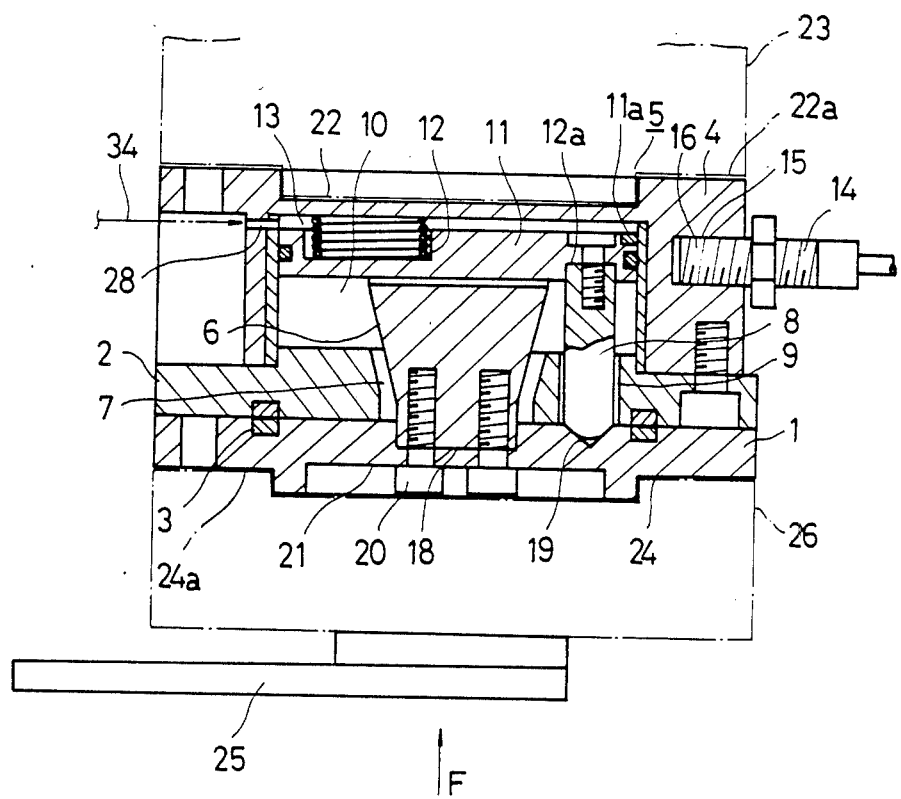

It is now assumed that the working arm 25 is attached to the movable plate 1 so that their respective planes are parallel with each other as shown in FIG. 4(A), and a painting operation is being carried out in accordance with a predetermined working program while detecting the configuration of an object being painted, or the multi-dimensional position thereof.

If, during this operation, an impact load is applied to the working arm 25 in the direction of the arrow F due to a foreign body accidentally entering path of movement of the working arm 25, or a functional error such as a sensing error or tactual function error, a force is applied to the pins 8 in the direction of the arrow F1 through the respective conical surfaces of the holes 19 of the movable plate 1 which is integrally connected to the working arm 25 through the connector 26. When the force exceeds a reference value, the movable plate 1 is turned in such a manner as to press the pins 8 respectively fitted in the holes 19, causing the distal ends of the pins 8 to come out of the respective holes 19 and thus allowing the movable plate 1 to become free. As a result, while avoiding and absorbing the impact load through turning, the movable plate 1 causes the piston 11 integral with the pins 8 to move, and the permanent magnet 11a consequently comes in proximity with the sensor switch 14, thus activating the switch 14 so as to quickly stop the operation of the function unit in the robot main body 17. When the pressure within the cylinder 10 is increased to a predetermined level by the movement of the piston 11 in the compressing direction, the relief valve 37 (shown in FIG. 1) is activated to discharge the air forced out from the cylinder 10 to the atmosphere or into the air storing tank so as to regulate the pressure. In this way, the piston 11 is operated in a shock absorber fashion, and the impact load applied to the movable plate 1 can be thereby effectively absorbed.

When a load is applied to the working arm 25 from the lower side as shown in FIG. 4(B), the movable plate 1 is displaced toward the fixed plate 2 while being maintained in a substantially horizontal position and turns ON the sensor switch 14 as described above.

In the case where the working arm 25 is attached to the movable plate 1 in such a manner that the axis of the arm 25 extends orthogonally with respect to the plane of the plate 1 as shown in FIG. 4(C), when an eccentric load is applied to this working arm 25 in the direction of the arrow F, the movable plate 1 acts in a manner similar to that in the case of the above-described impact load and turns ON the sensor switch 14.

The present invention arranged as described above offers the following advantages:

(1) The buffer mechanism is disposed between the swivel arm of the robot main body and the working arm selected in accordance with the kind of work to be conducted. It is therefore possible to reliably protect the function unit in the robot main body by instantaneously stopping the operation of the function unit in response to the detection of impact load which may be suddenly and accidentally applied to the working arm in operation, such as an eccentric load, axial load, or moment load.

(2) Since the movable plate is movably linked with the fixed plate through the center guide and the guide hole which have configurations conformable to each other, it is possible to cope with the impact load applied to the movable plate through the working arm in any direction. In addition, the buffer mechanism is able to quickly respond to any impact load, so that it is possible to reliably protect the function unit of the robot main body from various kinds of impact loads.

(3) When an impact load acts on the movable plate in the planar direction thereof, the movable plate absorbs this impact load through the pins and then transfers this load to the piston through the pins, the load then being absorbed and removed by means of the converting mechanism which operates in unison with the movement of the piston. After the impact load has been removed, the movable plate can be manually restored to its normal position. It is therefore possible to completely eliminate the disadvantage conventionally experienced when the robot needs to be re-taught after the removal of an impact load and while the operation of the robot must be stopped during the re-teaching operation.

(4) The buffer mechanism is so designed that the swivel arm, working arm, tactual head and so forth can be readily attached to the mechanism through the simple fitting surfaces provided on the movable and base plates thereof. It is therefore possible for the buffer mechanism to be readily attached to and detached from the main body of a robot, e.g., an industrial robot which posseses a high-level function such as a tactual function or a function of detecting the configuration of an object, a random arrangement of objects, or a multi-dimensional arrangement of objects. In addition, it is possible to absorb and avoid vibrations and impact loads experienced with industrial machines, hand tools and motor vehicles and thereby reliably protect them from various kinds of accidents.

While the invention has been particularly shown and described with reference to the preferred embodiments thereof it will be understood by those skilled in the art that any changes and variations can be made therein without departing from the spirit and scope of the invention.

What is claimed is:

1. An anti-impact safety apparatus for a robot comprising a buffer mechanism disposed between a swivel arm provided on the main body of the robot and constituted by a plurality of articulated mechanisms and a working arm supported by said swivel arm, said working arm having an individual working function and being selected in accordance with the kind of work which is to be conducted, said buffer mechanism including piston means for absorbing an impact load on said working arm by means of gas or liquid pressure contained within said piston means, whereby when an impact load, such as an axial load, eccentric load or moment load, is applied to said working arm in operation, said load is absorbed by said buffer mechanism, said buffer mechanism further including a sensor switch which detects said impact load and is activated to instantaneously stop the operation of the robot when said impact load exceeds a reference value, thereby protecting said working arm and a function unit incorporated in the robot main body from said impact load and further allowing said working arm to be readily restored to its normal position when eccentricity of said working arm produced as a result of the impact is corrected, said buffer mechanism also including a fixed plate which has a conical guide hole extending through a substantially central portion of a planar side thereof and a plurality of pin receiving bores surrounding said guide hole and extending through said fixed plate, a movable plate movable towards and away from said fixed plate, a center guide mounted on said movable plate and extending into said guide hole so as to be omnidirectionally tiltable, said center guide having an external conical configuration on an end thereof conformable to that of said guide hole, said piston means including a piston which is movable towards and away from said fixed plate and pins disposed on said piston with each of said pins slidably fitted into a respective one of said pin receiving bores in said fixed plate.

2. An anti-impact safety apparatus according to claim 1, wherein said buffer mechanism further includes an elastic seal interposed between said movable plate and said fixed plate, said movable plate having a seat provided in the side thereof which faces said fixed plate, said seat rigidly receiving an end of said center guide which is opposite to the conical end thereof and said movable plate having a plurality of substantially conical holes provided therein so as to surround said seat, said pins having free ends thereof respectively fitted into said conical holes in such a manner that when a torsional impact load is applied to said movable plate, the free ends of said pins are disengaged from the respective holes.

3. An anti-impact safety apparatus according to claim 2, wherein said buffer mechanism further includes a base plate connected to said fixed plate with said fixed plate between said base plate and said movable plate, said base plate including a cylinder having said piston slidably received therein which is operated by fluid pressure, and said base plate further having a through-hole therein adapted for connection to a pressurized source of fluid, such as gas or liquid, said through-hole being provided in a wall of said base plate which forms a wall of said cylinder such that said through-hole is communicated with the interior of said cylinder.

4. An anti-impact safety apparatus according to claim 3, further comprising a pressure converting mechanism which includes a gas supply source, a gas line connecting together said gas supply source and said through-hole provided in said cylinder of said base plate, an intermediate portion of said gas line being connected to an electropneumatic pressure regulating valve, a check or non-return valve, a solenoid-controlled valve, and a relief valve for coping with abnormally high pressure, whereby when an impact load is applied to said movable plate and the pressure within said cylinder is consequently increased so as to exceed a set value, the gas within said cylinder is discharged to the atmosphere or into a gas storing tank by the operation of said relief valve, and the omnidirectional impact load applied to said movable plate is thereby absorbed and removed in a shock absorber fashion.

5. An anti-impact safety apparatus according to claim 4, wherein a permanent magnet is disposed on said piston, and said sensor switch comprises a magnetically operated sensor switch disposed on the outer peripheral surface of said cylinder such that said permanent magnet and a terminal portion of said sensor switch come into and out of proximity with each other in response to the movement of said piston, whereby an overload applied to said movable plate is thereby detected by said sensor switch which is activated to stop the operation of the robot.

6. An anti-impact safety apparatus according to claim 5, wherein said electropneumatic pressure regulating valve is adjustable by means of an electrical signal for setting a reference value employed for absorbing and removing the impact load applied to said movable plate whereby the reference value can be varied as desired by changing the set pressure of said electropneumatic pressure regulating valve by means of said electrical signal.

7. An anti-impact safety apparatus according to claim 2, wherein said buffer mechanism includes a pressure adjusting mechanism and is disposed between a motor vehicle comprising the main body of the robot and a bumper mounted thereon comprising the working arm of the robot.

8. An anti-impact safety apparatus according to claim 2, wherein said buffer mechanism is detachably connected to a working arm comprising a tactual head having a tactual portion thereon.

9. An anti-impact safety apparatus according to claim 2, wherein said buffer mechanism includes a pressure adjusting mechanism and the robot comprises a structure which is required to possess resistance against earthquake shock and the working arm comprises a foundation.

10. An anti-impact safety apparatus for absorbing an impact load and outputting a detection signal when the impact load exceeds a predetermined load, said apparatus adapted for connection between two members, one of which receives the impact load and the other of which receives the detection signal from said apparatus when the load exceeds a reference value, comprising:
a buffer mechanism adapted for connection between the two members to absorb an impact load on one of the members, said buffer mechanism including a movable plate adapted for connection to a first member which receives an impact load, said movable plate having a conical guide mounted on a planar side thereof, said buffer mechanism including a fixed plate adapted for connection to a second member having a function unit associated therewith and which is operated electrically, said fixed plate having a planar side thereof facing said planar side of said movable plate, said fixed plate having a conical guide hole extending therethrough at a central portion of said planar side thereof, said guide hole receiving said guide and having a configuration conformable to said guide whereby said guide is omnidirectionally tiltable in said guide hole, said fixed plate having a plurality of pin receiving bores extending through said planar side thereof at positions surrounding said guide hole, said buffer mechanism further including piston means for absorbing an impact load transmitted from the first member to said movable plate, said piston means including a piston biased towards said fixed plate by pressurized fluid and movable towards and away from a planar side of said fixed plate facing away from said movable plate, said piston supporting a plurality of pins each of which extends through a respective one of said pin receiving bores in said fixed plate and said buffer mechanism including a sensor switch means for detecting the impact load transmitted from the first member to said movable plate and providing a detection signal to stop operation of the function unit associated with the second member when the impact load exceeds a reference value.

11. The apparatus of claim 10, wherein said buffer mechanism further includes an elastic seal connected between said movable plate and said fixed plate, said movable plate further including a plurality of substantially conical holes on said planar side thereof facing said fixed plate, each of said conical holes being aligned with a respective one of said pins, each of said pins having a free end received in a respective one of said conical holes when said fixed plate and said movable plate are aligned in a predetermined angular position and said free end of each of said pins being disengaged from said conical holes in said movable plate when said fixed plate and said movable plate are rotated with respect to each other out of said predetermined angular position.

12. The apparatus of claim 10, wherein said conical guide is larger in cross section taken in a plane parallel to said planar side of said movable plate at points located further away from said movable plate and said conical guide hole in said fixed plate is larger in cross section taken in a plane parallel to said planar side of said fixed plate facing said movable plate at points located further away from said planar side thereof facing said movable plate.

13. The apparatus of claim 10, further comprising a pressure converting mechanism connected to said piston means for supplying and discharging fluid under pressure to and from said piston means, said pressure converting mechanism including a source of pressurized fluid, a fluid passage extending between said source of pressurized fluid and said piston means, a pressure-regulating valve disposed in said fluid passage for regulating fluid pressure in said piston means, and a relief valve connected to said fluid passage to discharge pressurized fluid from said line when an impact load on said piston raises fluid pressure in said piston means above a level at which said relief valve is set.

14. The apparatus of claim 13, wherein said pressure-regulating valve comprises an electropneumatic pressure regulating valve which can be set to a reference value automatically by an electrical signal to thereby adjust the fluid pressure supplied to said piston means at which said sensor switch means provides said signal to stop operation of the function unit when the impact load acting on said movable plate causes fluid pressure in said piston means to exceed the fluid pressure being supplied to said piston means by said electropneumatic pressure regulating valve.

15. The apparatus of claim 10, wherein said piston means includes spring means biasing said piston towards said fixed plate and said sensor switch means comprises a magnetically actuated switch disposed along the path of movement of the piston and a magnet disposed on said piston for actuating said switch when said magnet is moved into proximity of said switch due to an impact load acting on said movable plate in excess of the reference value.

16. The apparatus of claim 10, wherein said piston means includes spring means biasing said piston towards said fixed plate and a pressure adjusting mechanism for adjusting the amount of pressure exerted by said spring means on said piston.

17. The apparatus of claim 16, wherein said piston means comprises a cylinder having said piston slidably received therein and said pressure adjusting mechanism comprises a jacket surrounding said cylinder and a plurality of fluid passages extending between said cylinder and said jacket on both sides of the path of movement of the piston to allow fluid to be forced through said jacket from a space in said cylinder on one side of said piston to a space in said cylinder on the other side of said piston when said piston is moved against the force of said spring means.

18. The apparatus of claim 16, wherein said piston means comprises a cylinder having said piston slidably received therein and said pressure adjusting mechanism comprises a spring retainer plate disposed in said cylinder with said spring means disposed between said spring retainer plate and said piston, said spring retainer plate having an annular V-shaped groove in a surface thereof facing an inner wall of said cylinder and an adjusting bolt extending through said cylinder and into said V-shaped groove for adjusting the position of said spring retainer plate with respect to said piston, said spring means comprising a spring disposed between said spring retainer plate and said piston whereby the force said spring exerts against said piston is varied by changing the distance said adjusting bolt extends into said V-shaped groove.

19. The apparatus of claim 16, wherein said piston means comprises a cylinder having said piston slidably received therein and said pressure adjusting mechanism comprises a spring retainer plate slidably disposed in said cylinder with said spring means comprising a spring disposed between said piston and said spring retainer plate and means for adjusting the distance between said spring retainer plate and said piston connected between said spring retainer plate and said cylinder for adjusting the force said spring exerts on said piston.

20. The apparatus of claim 18, wherein said piston means comprises a cylinder having said piston slidably received therein and said pressure adjusting mechanism comprises a spring retainer plate slidably disposed in said cylinder with said spring means comprising a spring disposed between said piston and said spring retainer plate, said spring retainer plate having a conical surface facing away from said piston and feed actuator means is disposed in said cylinder for moving in contact with said conical surface to adjust the distance between said spring retainer plate and said piston to thereby adjust the force said spring exerts on said piston.

21. The apparatus of claim 16, wherein said piston means comprises a cylinder having said piston slidably received therein and said pressure adjusting mechanism includes guide pin means for guiding said spring retainer plate towards and away from said piston.

22. The apparatus of claim 10, wherein said piston means comprises a cylinder having said piston slidably received therein and a pressure adjusting mechanism is provided for adjusting pressure on said piston in the direction towards said fixed plate, said pressure adjusting mechanism comprising a pair of fluid inlets in fluid communication with said cylinder, each of said inlets being on an opposite side of the path of movement of said piston and selectively connected to a source of fluid pressure and a cover is disposed between said piston and said fixed plate, said cover being secured to said fixed plate and providing a space for travel of said guide therein whereby said pins can be brought out of engagement with said movable plate by supplying fluid under pressure through the one of said fluid inlets which is on the fixed plate side of the path of movement of said piston.

23. The apparatus of claim 10, wherein said piston is biased towards said fixed plate by pressurized gas.

24. The apparatus of claim 10, wherein said piston is biased towards said fixed plate by pressurized liquid.

* * * * *